(12) United States Patent
Yamakawa et al.

(10) Patent No.: US 9,715,116 B2
(45) Date of Patent: Jul. 25, 2017

(54) COLOR MIXING DEVICE AND DISPLAY DEVICE

(71) Applicant: NIPPON SEIKI CO., LTD., Niigata (JP)

(72) Inventors: Yasuhiro Yamakawa, Niigata (JP); Shun Sekiya, Niigata (JP)

(73) Assignee: NIPPON SEIKI CO., LTD, Niigata (JP)

( * ) Notice: Subject to any disclaimer, the term of this patent is extended or adjusted under 35 U.S.C. 154(b) by 0 days.

(21) Appl. No.: 14/897,558

(22) PCT Filed: Jun. 19, 2014

(86) PCT No.: PCT/JP2014/066259
§ 371 (c)(1),
(2) Date: Dec. 10, 2015

(87) PCT Pub. No.: WO2014/208441
PCT Pub. Date: Dec. 31, 2014

(65) Prior Publication Data
US 2016/0139416 A1    May 19, 2016

(30) Foreign Application Priority Data

Jun. 28, 2013  (JP) .................................. 2013-135730
Jul. 23, 2013  (JP) .................................. 2013-152285

(51) Int. Cl.
*G02B 27/14*      (2006.01)
*G02B 27/10*      (2006.01)
(Continued)

(52) U.S. Cl.
CPC ......... *G02B 27/102* (2013.01); *G02B 26/101* (2013.01); *G02B 27/0101* (2013.01);
(Continued)

(58) Field of Classification Search
CPC .................................................... G02B 27/102
(Continued)

(56) References Cited

U.S. PATENT DOCUMENTS

2010/0302513 A1* 12/2010 Takahashi .............. G03B 33/12
353/33

FOREIGN PATENT DOCUMENTS

JP    H07-270711 A    10/1995
JP    2008-015299 A    1/2008
(Continued)

OTHER PUBLICATIONS

International Search Report dated Aug. 26, 2014, received in related International Application No. PCT/JP2014/066259, filed Jun. 19, 2014 (translation is provided).
(Continued)

*Primary Examiner* — James Jones
(74) *Attorney, Agent, or Firm* — McDermott Will & Emery LLP (57) ABSTRACT

A color mixing device and a display device are configured to represent the color white in a consistent fashion, even in low-luminance areas. These devices are provided with: a red light source for outputting red light at optical intensity in response to a first current presented thereto; a green light source for outputting green light at optical intensity in response to a second current presented thereto; a blue light source for outputting blue light at optical intensity in response to a third current presented thereto; and a color mixing means for color mixing of the red light, the green light, and the blue light together. A light attenuating part transmits or reflects the blue light, bringing about attenuation and advance thereof in the output direction. The blue light output by the blue light source is attenuated to a greater extent than the light of the other colors during output.

8 Claims, 8 Drawing Sheets

(51) Int. Cl.
   *G02B 26/10*   (2006.01)
   *G02B 27/01*   (2006.01)
   *G09G 3/00*    (2006.01)
   *G09G 3/02*    (2006.01)

(52) U.S. Cl.
   CPC ....... *G02B 27/104* (2013.01); *G02B 27/1046* (2013.01); *G02B 27/141* (2013.01); *G09G 3/002* (2013.01); *G09G 3/003* (2013.01); *G09G 3/025* (2013.01); *G02B 2027/0112* (2013.01); *G02B 2027/0114* (2013.01); *G02B 2027/0118* (2013.01); *G09G 2320/043* (2013.01); *G09G 2320/0666* (2013.01); *G09G 2380/10* (2013.01)

(58) Field of Classification Search
   USPC ........................................................ 359/634
   See application file for complete search history.

(56) References Cited

FOREIGN PATENT DOCUMENTS

| | | |
|---|---|---|
| JP | 2009-145911 A | 7/2009 |
| JP | 2011-008221 A | 1/2011 |

OTHER PUBLICATIONS

Notification of Reasons for Refusal mailed Feb. 28, 2017 issued in Japanese Patent Application No. 2013-135730 (with English translation).

\* cited by examiner

COLOR MIXING DEVICE AND DISPLAY DEVICE

CROSS-REFERENCE

This application is the U.S. National Phase under 35 U.S.C. §371 of International Application No. PCT/JP2014/066259, filed Jun. 19, 2014, which claims the benefit of Japanese Application Nos. 2013-135730, filed Jun. 28, 2013 and 2013-152285, filed on Jul. 23, 2013, the entire contents of each are hereby incorporated by reference.

TECHNICAL FIELD

The present invention relates to a color mixing device and a display device.

BACKGROUND ART

Conventionally, as a display device, the one that scans laser light emitted by a laser light source on a screen by way of a scanning system to thereby generate a display image is disclosed in Patent Literature 1.

The display device described above is provided with: a color mixing device which combines red, green, and blue laser light beams and then emits the combined laser light (combined laser light); and a scanning part which scans the combined laser light emitted from this color mixing device to thereby generate a color image, for example. The color mixing device carries out white balance adjustment and color-mixes red, green, and blue at a predetermined ratio to thereby represent a color white. For example, the color mixing device carries out color mixing so that a color mixing ratio of optical intensity of red, green, and blue is on the order of the ratio of about 2.9:2.4:1 to thereby represent white. Specifically, the color mixing device carries out white balance adjustment by controlling a current value of each laser light source so that the color mixing ratio of the respective laser light beams is obtained as a predetermined ratio.

CITATION LIST

Patent Literature

Patent Literature 1: Japanese Unexamined Patent Application Publication No. H07-270711

SUMMARY OF THE INVENTION

Problems to be Solved by the Invention

However, the laser light source mentioned above has a current threshold value at which laser oscillation is started. In a region of which value is close to this current threshold value (an inconsistent oscillation region), laser oscillation becomes inconsistent. Thus, in the inconsistent oscillation region, there arises a problem that the color mixing device neither is capable of emitting light having a desired optical intensity, nor is capable of representing a color white in a consistent fashion.

Accordingly, the present invention has been made in view of the circumstances described above, and it is an object of the present invention to provide a color mixing device and a display device which are capable of representing the color white in the consistent fashion even in a low luminance area.

Means for Solving the Problem

In order to solve the problems, the present invention adopts the following configuration.

That is, a color mixing device according to a first aspect of the present invention includes: a red light source which emits red light at optical intensity in response to a first current to be supplied; a green light source which emits green light at optical intensity in response to a second current to be supplied; a blue light source which emits blue light at optical intensity in response to a third current to be supplied; a light source control part which controls the light sources; and color mixing means for mixing the red light, the green light, and the blue light in all, wherein a light attenuating member which attenuates the blue light emitted from the blue light source is provided.

Further, a display device according to a second aspect of the present invention includes: the color mixing device according to the first aspect of the present invention; and a scanning part which scans the color-mixed light that is mixed by the color mixing means to thereby generate an image.

Effect of the Invention

According to the color mixing device and the display device of the present invention, it is possible to represent the color white in the consistent fashion even in the low luminance area.

MODE FOR CARRYING OUT THE INVENTION

Hereinafter, an embodiment in which a display device of the present invention is applied to a headup display device (an HUD device) which is mounted on a vehicle will be described with reference to the drawings. It is to be noted that, although in the embodiment, there was described an example in which the display device is applied to the HUD device, the present invention is not limited thereto.

First Embodiment

Figure 1:
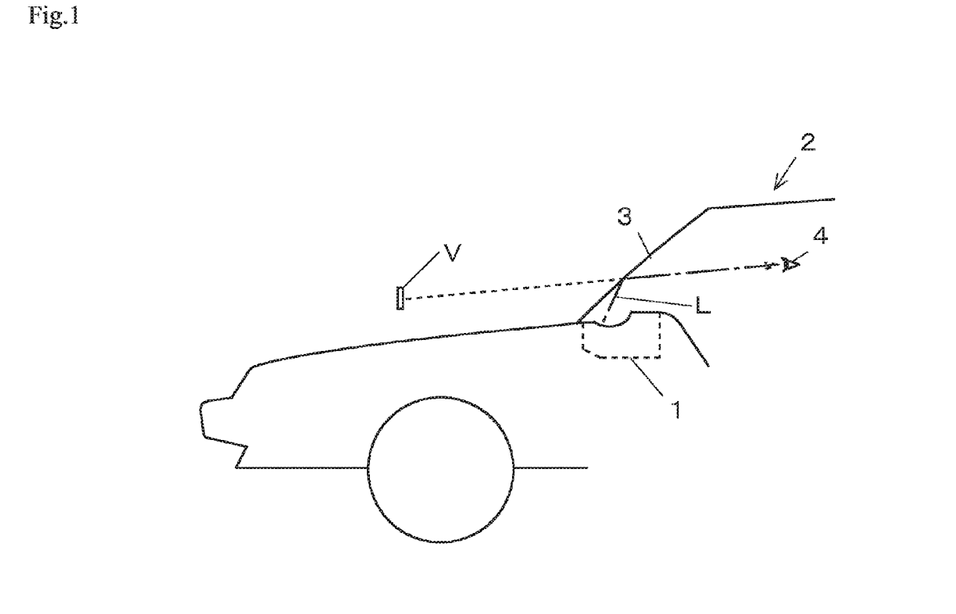
FIG. 1 is a view for explaining a mounting mode of an HUD device according to a first embodiment of the present invention.

A display device according to a first embodiment of the present invention is a headup display (HUS) device 1 shown in FIG. 1. The HUD device 1, as shown in the figure, is arranged on a dashboard of a vehicle 2, and emits to a windshield 3, display light L representative of an image M (refer to FIG. 2) to notify a predetermined item of information. The display light L that is reflected by the windshield 3 is visually recognized by an observer 4 (mainly, a driver of the vehicle 2) as a virtual image V of the image M that is formed in front of the windshield 3. Thus, the HUD device 1 causes the observer 4 to visually recognize the image.

Figure 2:
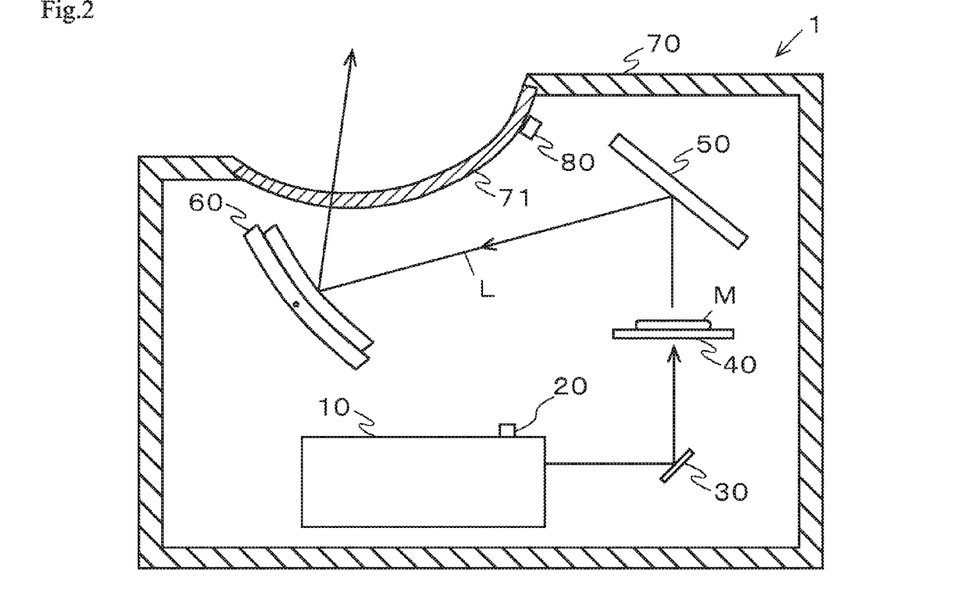
FIG. 2 is a schematic sectional view of the HUD device.

The HUD device 1, as shown in FIG. 2, is provided with: a laser light emitting part 10; an optical intensity detecting part 20; a MEMS (Micro Electro Mechanical System) mirror 30; a screen 40; a first reflection part 50; a second reflection part 60; a casing 70; and a luminance detecting part 80.

Figure 3:
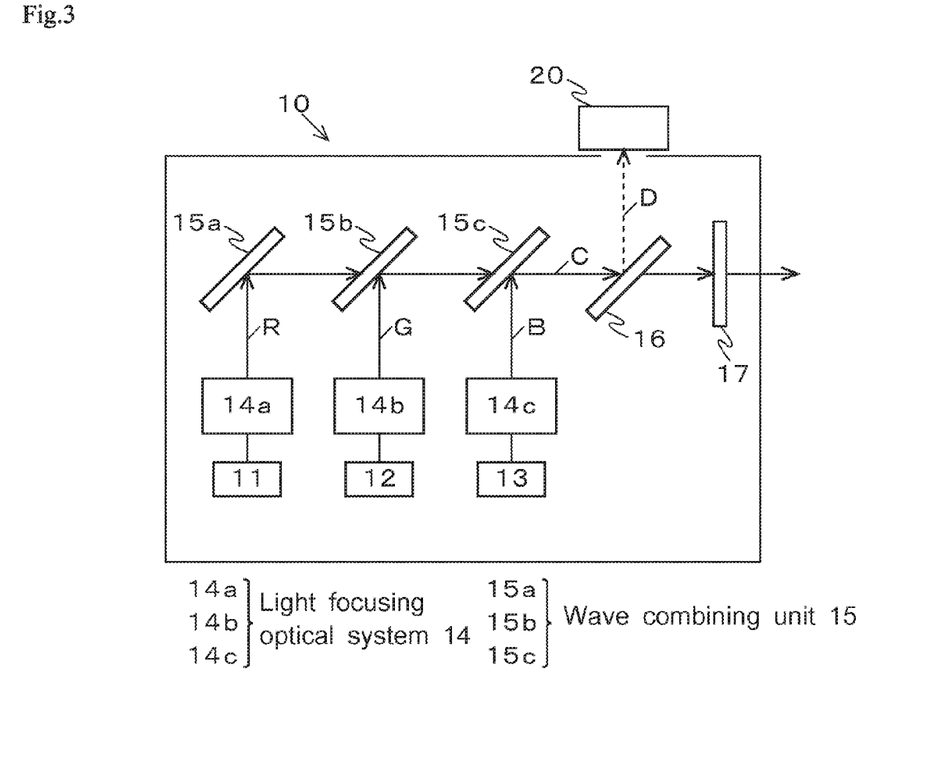
FIG. 3 is a schematic sectional view of a laser light emitting part of the embodiment.

The laser light emitting part 10 mixes light beams of a plurality of colors, and emits combined laser light C, which will be described later, to the MEMS mirror 30. The laser light emitting part 10, as shown in FIG. 3, has: laser diodes (hereinafter, referred to as LD) 11, 12, 13; a light focusing optical system 14; a wave combining unit 15; a light attenuating part 16, a light dimming part 17; and an optical intensity detecting part 20. It is to be noted that the laser light emitting part 10 is equivalent to a specific example of the "color mixing device" in the present invention.

The LD 11 emits red laser light R having a peak at a wavelength of about 640 nm. The LD 12 emits green laser light G having a peak at a wavelength of about 520 nm. The LD 13 emits blue laser light B having a peak at a wavelength of about 450 nm. The LD 11, the LD 12, the LD 13 each emits light at a predetermined optical intensity and timing when a driving signal (a driving current) is supplied from an LD control part 100 which will be described later. Also, the LD 11, the LD 12, the LD 13 respectively have current-optical intensity characteristics (refer to FIG. 4). The current-optical intensity characteristics of the LD 11, the LD 12, the LD 13 will be described later in detail. It is to be noted that the LD 11 is equivalent to a specific example of the "red color source" in the present invention. In addition, the LD 12 is equivalent to a specific example of the "green light source" in the present invention. Further, the LD 13 is equivalent to a specific example of the "blue light source" in the present invention.

The light focusing optical system 14 focuses the respective laser light beams R, G, B emitted by the respective LD 11, LD 12, LD 13. Specifically, the light focusing optical system 14 is composed of light focusing optical systems 14a, 14b, and 14c, each of which is made of a lens or the like. The light focusing optical system 14a is positioned on an optical path of the laser light R that is emitted from the LD 11; the light focusing optical system 14b is positioned on an optical path of the laser light G that is emitted from the LD 12; and the light focusing optical system 14c is positioned on an optical path of the laser light B that is emitted from the LD 13.

The wave combining unit 15 combines the respective laser light beams R, G, B emitted from the respective LD 11, LD 12, LD 13, passing through the light focusing optical system 14 and arriving thereat, and emits a beam of combined laser light C. Specifically, the wave combining unit 15 is composed of a first wave combining part 15a which reflects light; and a second wave combining part 15b and a third wave combining part 15c respectively made of dichroic mirrors or the like, each of which reflects light with a specific wavelength, but transmits light with another wavelength. It is to be noted that the wave combining unit 15 is equivalent to a specific example of "color mixing means" in the present invention.

The first wave combining part 15a reflects incident laser light R to the second wave combining part 15b. It is to be noted that the first wave combining part 15a may be composed of a member associated with transmission as well as reflection, and may transmit the incident laser light R to the second wave combining part 15b.

The second wave combining part 15b transmits the laser light R from the first wave combining part 15a as it is, and reflects incident laser light G to the third wave combining part 15c. In this manner, from the second wave combining part 15b, the combined laser light obtained by combining the laser light R and the laser light G with each other is emitted to the third wave combining part 15c.

The third wave combining part 15c transmits the combined laser light from the second wave combining part 15b as it is, and reflects the incident laser light B to the light dimming part 17. In this manner, the combined laser light C obtained by combining the laser light beams R, G and the laser light B in all advances from the third wave combining part 15c to the light attenuating part 16.

Figure 5:
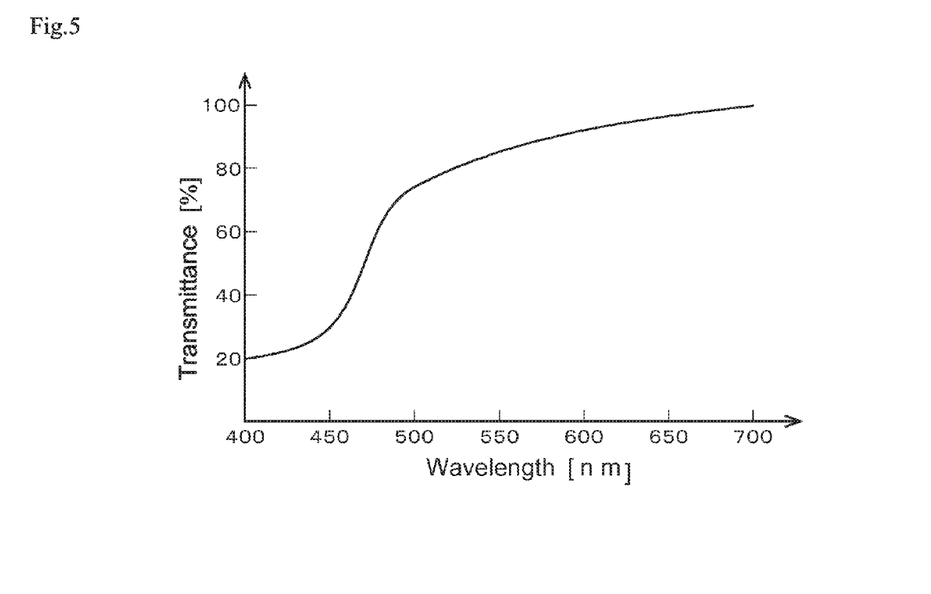
FIG. 5 is a view explaining wavelength dependency of an optical intensity attenuating part of the embodiment.

The light attenuating part 16 is a member which attenuates an optical intensity of the laser light B, for example, is a member which comparatively significantly transmits light in a long wavelength region (the laser light R or the laser light G) and less significantly transmit (significantly reflect) light in a short wavelength region (the laser light B), and is composed of a dichroic mirror or a reflection type band pass filter or the like in which a dielectric multilayered film having the wavelength-transmittance characteristics (bypass characteristics) as shown in FIG. 5 is provided. This light attenuating part 16 is disposed between the third wave combining part 15c and the light dimming part 17 so as to incline a light incidence face so that the combined laser light C is incident so as to have a predetermined angle of incidence; transmits partial laser light C in the direction of the light dimming part 17; and reflects the partial combined laser light C as reflection light in the direction of the optical intensity detecting part 20. A detailed description of functions of this light attenuating part 16 will be furnished later.

The light dimming part 17 has: a polarization control element (not shown) such as a liquid crystal panel: and a polarizing plate (not shown) which is arranged on each face of this light dimming control element. This light dimming part 17 adjusts a polarization angle of the combined laser light C incident from the polarization control element under the control of a light dimming control part 300 which will be described later (on the basis of light dimming control data supplied from the light dimming control part 300) and then adjusts optical intensity of the combine laser light C that has transmitted the light dimming part 17. The combined laser light C that has transmitted the light attenuating part 16 is emitted to the MEMS mirror 30. It is to be noted that an organic material and an insulation film are employed in a portion constituting an alignment film of the liquid crystal panel. The organic material has a feature that the material is degraded if it is irradiated with blue laser light or laser light with a shorter wavelength than that of the blue laser light.

Thus, the light attenuating part 16 is installed in a gap between the LD 13 and the light dimming part 17, whereby the liquid crystal panel is irradiated with the attenuated laser light B, making it possible to increase the precision of color mixing while restraining degradation of the organic material.

The optical intensity detecting part 20 is made of a color sensor or a photodiode or the like, receives reflection light D reflected on the light attenuating part 16, and detects optical intensity of a respective one of the laser light beams R, G, B that constitute the received reflection light D. Specifically, the optical intensity detecting part 20 outputs a detection signal (a voltage) in response to the optical intensity, and this detection signal is converted to a digital value by way of an A/D (Analog/Digital) converter and then the converted signal is output as optical intensity information to a main control part 400 which will be described later. It is sufficient if the optical intensity detecting part 20 is capable of detecting the optical intensity of the respective one of the laser light beams R, G, B, and thus, in place of an optical path of the combined laser light C, for example, a plurality of optical detecting parts may be provided separately at sites which are capable of detecting the optical intensity of the respective one of the laser light R, the laser light G, and the laser light B before combined.

The MEMS mirror 30 receives the combined laser light C from the laser light emitting part 10 and then scans the received combined laser light C on the screen 40 under the control of a scanning control part 200 which will be described later (on the basis of a scanning control signal which is supplied from the scanning control part 200). In this manner, the image M is displayed on the screen 40. It is to be noted that the MEMS mirror 30 is equivalent to a specific example of the "scanning part" in the present invention.

The screen 40 receives the combined laser light C from the MEMS mirror 30 on a rear face and then transmits the light to thereby display the image M on a front face side. The screen 40 is composed of a holographic diffuser, a micro lens array, a scattering plate or the like, for example.

The first reflection part 50 is made of a planar mirror or the like, receives display light L representative of the image M that is displayed on the screen 40 and then reflects the received light toward the second reflection part 60.

The second reflection part 60 is made of a concave mirror or the like, and reflects the display light L from the first reflection part 50 in the direction of the windshield 3. The display light L that is reflected by the second reflection part 60 arrives at the windshield 3 via a light transmitting part 71.

The casing 70 houses: the laser light emitting part 10; the optical intensity detecting part 20; the MEMS mirror 30; the screen 40; the first reflection part 50; and the second reflection part 60 or the like, and is formed of a light shielding member. It is to be noted that the light transmitting part 71 made of a light transmissive resin such as acryl is engaged with a part of the casing 70, and this light transmitting part 71 transmits the display light L from the second reflection part 60 in the direction of the windshield 3, and is formed in a curved shape so that external light from the outside of the HUD device 1 does not reflect in the direction of the observer 4.

The luminance detecting part 80 is a luminance sensor which is disposed inside of the light transmitting part 71, and detects the luminance at the periphery of the observer 4 (the vehicle 2) and then outputs to the main control part 400 the luminance data related to adjustment of the luminance of the image M as an electric signal. Incidentally, it is sufficient if the luminance detecting part 80 is capable of detecting the luminance at the periphery of the vehicle 2 in place of being provided at the light transmitting part 71 of the HUD device 1 as shown in FIG. 2, and thus, this detecting part may be disposed in the windshield 3 or on the dashboard (not shown) of the vehicle 2. Also, there may be a case in which the luminance detecting part 30 converts the luminance data to an HUD luminance signal by an ECU of the vehicle 2 and outputs the converted signal to the main control part 400 in place of directly outputting the luminance data to the main control part 400 of the HUD device 1.

Next, an electrical configuration of the HUD device 1 will be described.

The HUD device 1, in addition to the one mentioned above, as shown in FIG. 6, is provided with: an LD control part 100; a scanning control part 200; a light dimming control part 300; and a main control part 400 that controls these LD control part 100, scanning control part 200, and light dimming control part 300. These control parts are implemented on a printed circuit board (not shown) which is arranged in the casing 70. It is to be noted that these control parts are arranged outside of the HUD device 1, and may be electrically connected to the HUD device 1 (such as the LD 11, the LD 12, the LD 13, the light dimming part (the polarization control element) 16, the optical intensity detecting part 20, and the MEMS mirror 30) by way of wiring.

Figure 6:
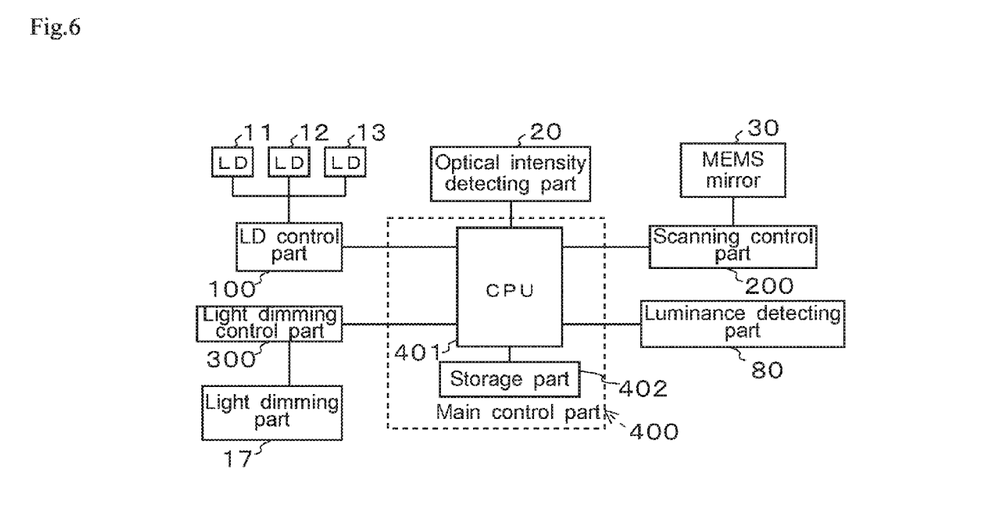
FIG. 6 is an electrical schematic view in the HUD device of the embodiment.

The LD control part 100 is made of a driver IC (Integrated Circuit) or the like which drives the LD 11, the LD 12, LD 13, and under the control of the main control part 400 (on the basis of gradation control data from the main control part 400), each of the LD 11, the LD 12, and the LD 13 is controlled as to gradation by way of a PWM (Pulse Width Modulation) control manner or a PAM (Pulse Amplitude Modulation) control manner.

The scanning control part 200 is made of a driver IC or the like which drives the MEMS mirror 30, and under the control of the main control part 400 (on the basis of scanning control data from the main control part 400), the MEMS mirror 30 is driven and then the image M is generated on the screen 40.

The light dimming control part 300 is made of a driver IC or the like which drives the polarization control element, and under the control of the main control part 400 (on the basis of the light dimming control data from the main control part 400), a polarization angle of the combined laser light C by the polarization control element is adjusted, and transmittance of the combined laser light C in the light dimming part 17 is controlled. The light dimming control data is at least a signal indicative of a high light output mode in which the transmittance of the light dimming part 17 is high and a low light output mode in which the transmittance is low, and the main control part 400 outputs to the light dimming control part 300 the light dimming control data in response to an signal output from the ECU (Electronic Control Unit) of the vehicle 2 which will be described later.

The high output mode is a mode for increasing the luminance of the image M (for setting the luminance to be high) in a case where an environment in which the observer 4 visually recognizes the image M is bright such as daytime, and the light dimming part 17 transmits the combined laser light C without almost no attenuation.

Also, the low output mode is a mode for lowering the luminance of the image M (for setting to low luminance) in a case where an environment in which the observer 4 visually recognizes the image M is dark such as nighttime, and the light dimming part 17 attenuates the combined laser light C. In this low output mode, the LD control part 100 can achieve low intensity display of the image M, merely by effecting gradation control which is substantially similar to that in the high output mode, without lowering the driving currents of the LD 11, the LD 12, LD 13 (without driving in the vicinity of an inconsistent oscillation region).

The main control part 400 is made of a microcontroller, an FPGA (Field Programmable Gate Array), an ASIC (Application Specific Integrated Circuit) or the like, and is provided with: a CPU (Central Processing Unit) 401 and a storage part 402. The storage part 402 stores programs or data required for operation of the HUD device 1, and is made of an EEPROM (Electrically Erasable Programmable Read-Only Memory), Flash or the like.

The CPU 401 reads out and executes a program from the storage part 402 to thereby control each part. To the CPU 401, there are input: various items of information such as vehicle information and a startup signal from an external device (not shown) such as the ECU of the vehicle 2; luminance data from the luminance detecting part 80; an HUD luminance signal; LD current data indicative of the values of the currents flowing toward the LD 11, the LD 12, the LD 13; and optical intensity information from the optical intensity detecting part 20, and from these items of information, the CPU 401 generates and outputs: illumination control data for driving the LD control part 100; light dimming control data for controlling the light dimming part 17; and display control data for driving the main scanning control part 200, and carries out comprehensive control of the HUD device 1. Namely, the CPU 401, according to the input information, drives the LD 11, the LD 12, the LD 13, and the MEMS mirror 30 and the light dimming part 17 via the LD control part 100 and the scanning control part 200 and the light dimming control part 300 and then generates the image M. In this manner, the display light L representative of the image M is emitted to the windshield 3, enabling the observer 4 to visually recognize the image M as a virtual image V.

The HUD device 1 made of the constituent elements mentioned above mixes colors of the laser light R, the laser light G, the laser light B that are emitted from the LD 11, the LD 12, the LD 13, respectively, to thereby represent the color white. A predetermined ratio to represent the color white is R:G:B=2.9:2.4:1, for example. For example, the HUD device 1 controls the current values of the LD 11, the LD 12, the LD 13 to thereby carry out white balance adjustment. Hereinafter, a white balance adjustment method will be specifically described.

First, current-optical intensity characteristics of the LD 11, the LD 12, the LD 13 constituting the HUD device 1 will be described.

Figure 4:
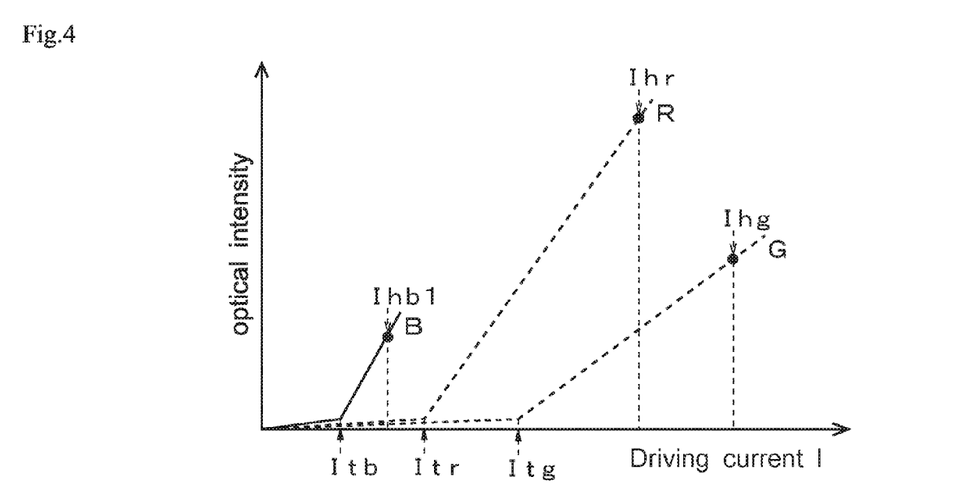
FIG. 4 is a diagram of optical intensity-current characteristics of a laser light source of the embodiment.

Also, the LD 11, the LD 12, the LD 13 each have the current-optical intensity characteristics as shown in FIG. 4. FIG. 4 is a view for explaining the current-optical intensity characteristics considering the optical intensity color mixing ratio in white balance adjustment of the RGB laser light sources. As shown in the figure, the LD 11, the LD 12, the LD 13 each have a current threshold value It (Itr, Itg, Itb) at which laser oscillation is started. In a region of which value is close to the current threshold value It, an inconsistent oscillation region in which laser oscillation becomes inconsistent is obtained, and in consideration of a margin, a lower limit driving current value, which is a lower limit current value at which the LD 11, the LD 12, the LD 13 are driven so as not to be an inconsistent oscillation region, is obtained as It+α. Here, symbol α is on the order of mA.

Figure 7:
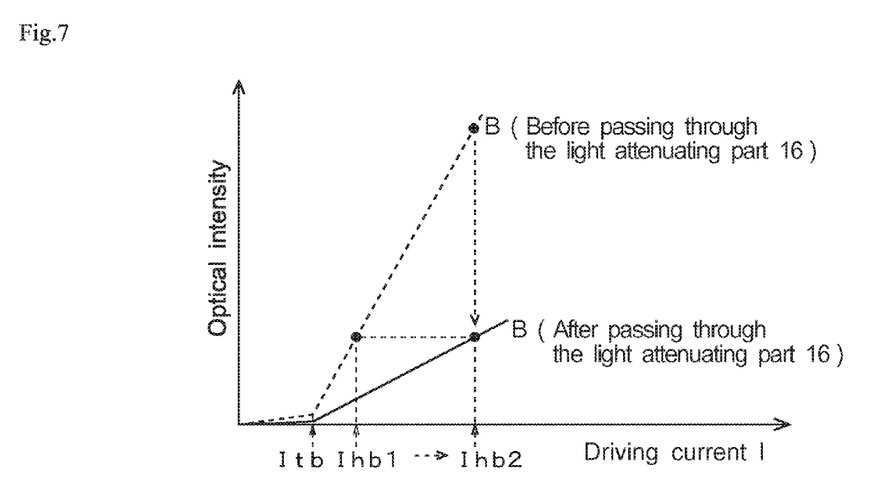
FIG. 7 is a view of optical intensity-current characteristics of the laser light source of the embodiment, and is a view explaining a function of the optical intensity attenuating part.

Also, the LD 11, the LD 12, the LD 13 each have an upper limit driving current value Ih (Ihr, Ihg, Ihb1 (Ihb2)) which is the maximum optical intensity considering the optical intensity color mixing ratio in white balance adjustment. It is to be noted that in FIG. 4 and FIG. 7, the current value that is the maximum optical intensity considering the optical intensity color mixing ratio in white balance adjustment in the case where the light attenuating part 16 is not provided is referred to as "Ihb1", and in FIG. 7, the current value that is the maximum optical intensity considering the optical intensity color mixing ratio in white balance adjustment in the case where the light attenuating part 16 is provided is referred to as "Ihb2".

It is to be noted that, a region in which consistent display or white balance adjustment is possible (hereinafter, referred to as a consistent region) is Ih−(It+α) from the upper limit driving current value Ih to the lower driving current value (It+α). Accordingly, it is desirable that a full gradation representation in the regions from (It+α) to Ih and white balance adjustment over the full gradation be carried out.

In the case where the light attenuating part 16 is not provided, the consistent region of the LD 13 is Ihb1−(Itb+α). That is, the LD 13 emits the laser light B at optical intensity in response to a third current in a consistent region ((Itb+α) to Ihb1). Similarly, the LD 11 emits the laser light R, at optical intensity in response to a first current in a consistent region ((Itr+α) to Ihr). In addition, the LD 12 emits the laser light G, at optical intensity in response to a second current in a consistent region ((Itg+α) to Ihg).

The consistent region ((Itb+α) to Ihb1) of the LD 13 is small in comparison with the consistent region ((Itr+α) to Ihr) of the LD 11 and the consistent region ((Itg+α) to Ihg) of the LD 12. In addition, in a case where the color white is represented, the color mixing ratio is R:G:B=2.9:2.4:1. That is, the laser light B must be small in quantity of light in comparison with the laser light R or the laser light G, and in a case where the color white with low luminance is represented by employing a low gradation region of the laser light R or the laser light G, there is a need to drive the LD 13 at a current which is lower than Itb+α, and it is difficult to represent the color white with the low luminance. Also, there is a limitation to the resolution of the current that can be applied to the LD 13 in a first driving part 101, and it is difficult to control a lot of gradations in the small consistent region ((Itb+α) to Ihb1) of the LD 13.

Figure 8:
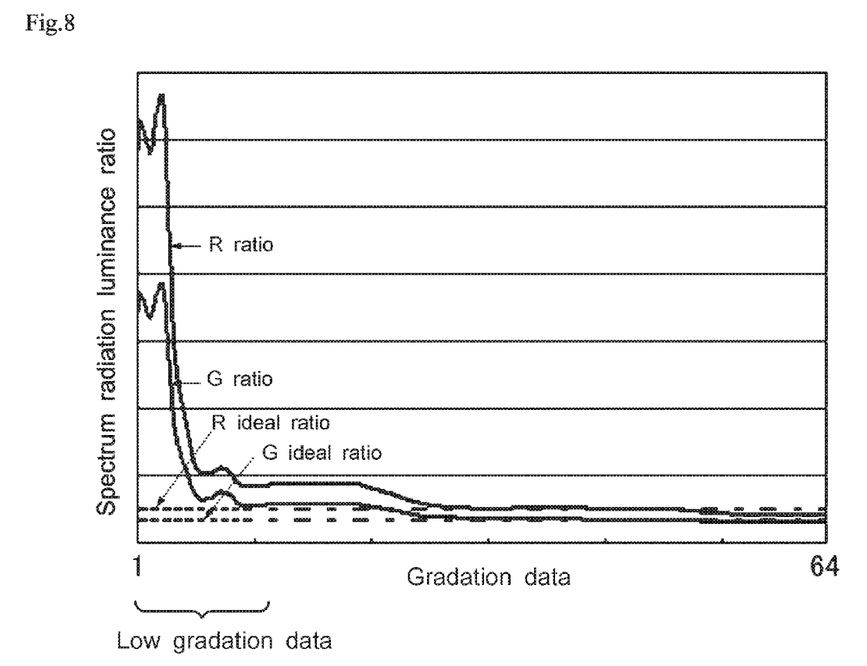
FIG. 8 is a view explaining a relationship of a spectrum radiation intensity ratio of laser light R and laser light G with reference to laser light B in full gradation/white display in a case where a light attenuating member is not provided.

FIG. 8 shows an actually measured value (solid line) and an ideal ratio (dashed line) of the spectrum radiation luminance ratio with reference to the LD 13 in full gradation and white display in the case where the light attenuating part 16 is not provided. As shown in the figure, the R ratio of the actually measured value is approximate to the R ideal ratio in a high gradation region and a middle gradation region (21 to 64/64), whereas in a low gradation region (1 to 20/64), a high value which deviates from the R ideal ratio is obtained. Similarly, the G ratio of the actually measured value is also approximate to the G ideal ratio in the high gradation region and the middle gradation region (21 to 64/64), whereas in the low gradation region (1 to 20/64), a high value which deviates from the G ideal ratio is obtained.

In particular, in gradations 1 to 8, the driving current I of the LD 13 is lower than the current threshold value It, and the actually measured value is obtained as a value which is 10 times greater than the ideal ratio. Thus, white balance adjustment cannot be carried out in the consistent fashion, resulting in so a called white balance loss that the display screen greatly deviates from the color white as a reference.

Next, the case in which the light attenuating part 16 is provided will be described. By providing the light attenuating part 16, even in the low gradation region, the driving current I that is a predetermined value (the lower light current value Itb+α) or more can be input and thus the region in which gradation representation is possible in the consistent fashion expands from Ihb1−(Itb+α) to Ihb2−(Itb+α) (refer to FIG. 7). In this manner, the consistent region in which white balance adjustment can be carried out in the consistent fashion also expands.

Figure 9:
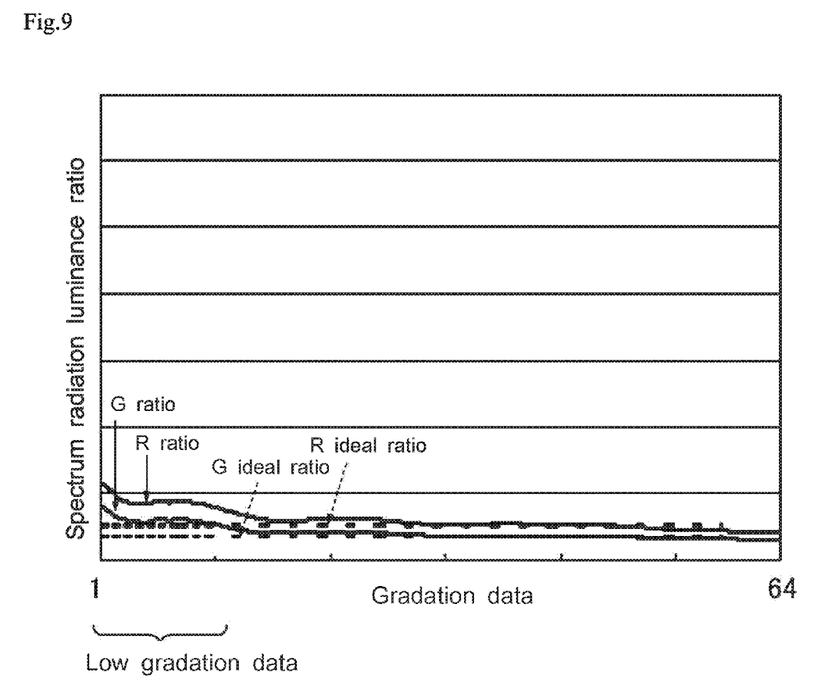
FIG. 9 is a view explaining a relationship of a spectrum radiation intensity ratio of laser light R and laser light G with reference to laser light B in full gradation/white display in a case where a light attenuating member is provided.

FIG. 9 shows an actually measured value and an ideal ratio of a spectrum radiation luminance ratio with reference to the LD 13 in full gradation and white display in the case where the light attenuating part 16 is provided. In comparison with the results of measurement shown in FIG. 8 as well, it is found that a deviation from the R, G ideal ratio for white balance adjustment is remarkably improved. The maximum deviation from the ideal ratio can be restrained to 2.25 times, and in comparison with the case in which the light attenuating part 16 is not provided (refer to FIG. 8), the precision of white balance adjustment is improved by about five times.

As described above, with the HUD device 1 according to the embodiment, the light attenuating part 16 is provided between the wave combining unit 15 and the light dimming part 17, whereby the optical intensity of the laser light B that is emitted from the LD 13 with a short wavelength (about 450 nm) can be attenuated. Thus, in comparison with the case in which the light attenuating part 16 is not provided, the LD 13 can be used at a high current value (Ihb2). Accordingly, when the LD 13 is used in the low gradation region, the LD 13 can be used at a higher current than that in the inconsistent region. In this manner, the LD 13 is used at the current that is not present in the inconsistent region and thus the optical intensity of the LD 13 can be stabilized. As a result, in the HUD device 1, the color white can be represented in the consistent fashion.

Also, in so far as the combined laser light C that is incident to the light attenuating part 16 is concerned, most of the laser light B is reflected as the reflection light D toward the optical intensity detecting part 20 and thus the optical intensity detecting part 20 is capable of detecting the laser light B with a high optical intensity, and the precision of optical intensity detection of the laser light B is improved. In this manner, the LD control part 100 is capable of precisely adjusting the driving current I of the LD 13 on the basis of the optical intensity of the laser light B that is detected by this optical intensity detecting part 20 and thus the precision of white balance adjustment can be improved.

In addition, by having the light dimming part 17 that adjusts the optical intensity of the respective one of the laser light B, the laser light G, and laser light B that are incident to the MEMS mirror 30, low luminance display of the image M can be achieved without lowering the driving currents of the LD 11, the LD 12, LD 13 (without driving in the vicinity of the inconsistent oscillation region).

Further, the laser light B that is incident to the light dimming part 17 is attenuated by the light attenuating part 16 and thus it is sufficient if the light dimming part 17 carries out adjustment of optical intensity of the laser light B as in the laser light R or the laser light G, there is no need to subject only the laser light B to special adjustment of optical intensity (significant attenuation), and the color white can be obtained by easy control of the light dimming part 17.

Furthermore, the LD control part 100 subjects the LD 11, the LD 12, the LD 13 to similar gradation control in the low output mode in which the transmittance of the combined laser light C of the light dimming part 17 is lowered and in the high output mode in which the transmittance of the combined laser light C is higher than that in the low output mode, and is capable of subjecting the image M to consistent gradation control in the high luminance (the high output mode) and the low luminance (the low output mode) without complicating gradation control by the LD control part 100.

Still furthermore, in a case where the liquid crystal panel is irradiated with the combined laser light C obtained by color-mixing the laser light R, the laser light G, and the laser light B, degradation of the liquid crystal panel can be restrained by attenuating the optical intensity of the laser light B. This is because an organic material constituting the alignment film and the insulation film of the liquid crystal panel is degraded by being irradiated with the laser light B. The degree of degradation of this organic material is proportional to the optical intensity of the laser light B and thus the optical intensity of the laser light B that is incident to the liquid crystal panel is attenuated in advance, whereby a load on the organic material of the liquid crystal panel can be mitigated.

Yet furthermore, by employing the light attenuating part 16 having a transmittance distribution which is inversely proportional to the luminance distribution of the respective laser light beams R, G, B, it is possible to make the optical intensity distribution uniform in an irradiation face of the laser light. In this manner, in a case where the liquid crystal panel is irradiated with the respective laser light beams R, G, B, degradation of the liquid crystal panel can be restrained. This is because, as characteristics of the laser light, it is known that the optical intensity is higher at a center of an irradiation range and the optical intensity is lower toward the periphery of the irradiation range. Thus, degradation of the organic material or the like arises from a center of laser light which is high in particular in optical intensity distribution of the laser light and then gradually expands to the periphery. As a result, the liquid crystal panel (the polarization control element) is irradiated with the laser light B, whereby degradation and damage of the organic material or the like arise. Owing to this, it becomes difficult to achieve a light dimming function with its extended service life.

Moreover, in the display device provided with the color mixing device having the constituent elements mentioned above, the LD 13 emits the laser light B in the consistent fashion, whereby white balance adjustment can be carried out, and the color white can be represented in the consistent fashion. As a result, a display image other than the color white can be displayed in the consistent fashion. In particular, in a case where the liquid crystal panel is employed as the light dimming part 17 and then this liquid crystal panel is irradiated with laser light, degradation of the organic material constituting the liquid crystal panel can be restrained by attenuating the optical intensity of the laser light B with the highest energy. As a result, the extended service life of the liquid crystal panel can be achieved.

Figure 10:
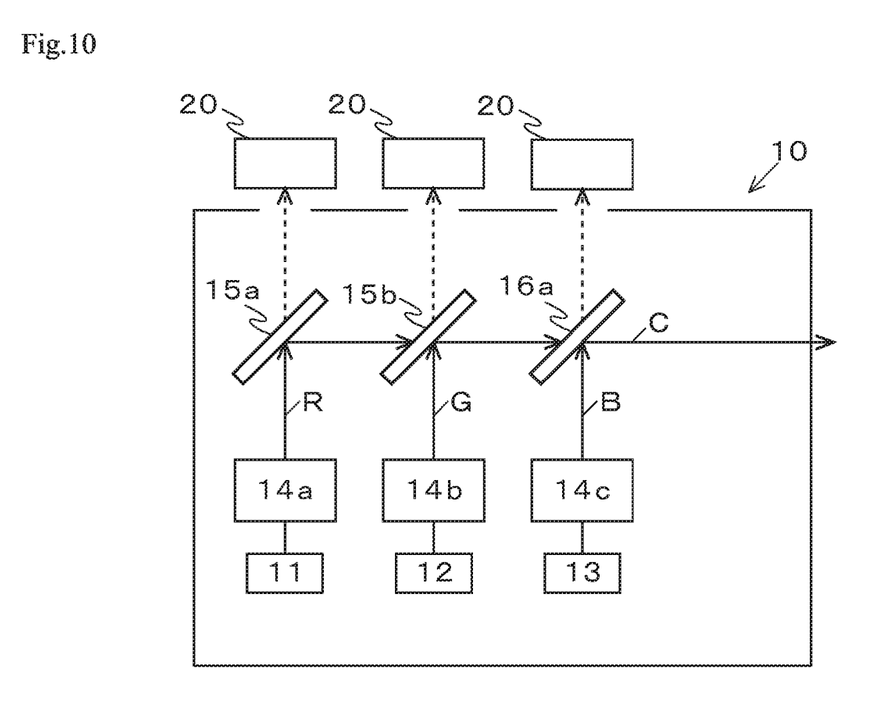
FIG. 10 is a schematic sectional view of a laser light emitting part in a modification example of the present invention.

It is to be noted that, although in the foregoing embodiment, the light attenuating part 16 was adapted to lower the transmittance of laser light with a short wavelength, there may be a second light attenuating part 16a to lower a reflection index of laser light with a short wavelength, and in such a case, the laser light emitting part 10, as shown in FIG. 10, for example, is disposed so that the reflection direction of the laser light B of the second light attenuating part 16a is coincident with an optical path of the combined laser light C. In this manner, the optical intensity of the laser light B in the combined laser light C can be lowered, and white balance adjustment can be carried out in the consistent fashion.

It is to be noted that the present invention is not limited by the embodiment and drawings described above. A variety of modifications (including deletion of the constituent elements) can be appropriately made to the embodiment and the drawings without departing from the spirit of the present invention. Hereinafter, one of modification examples will be described.

Second Embodiment

Figure 11:
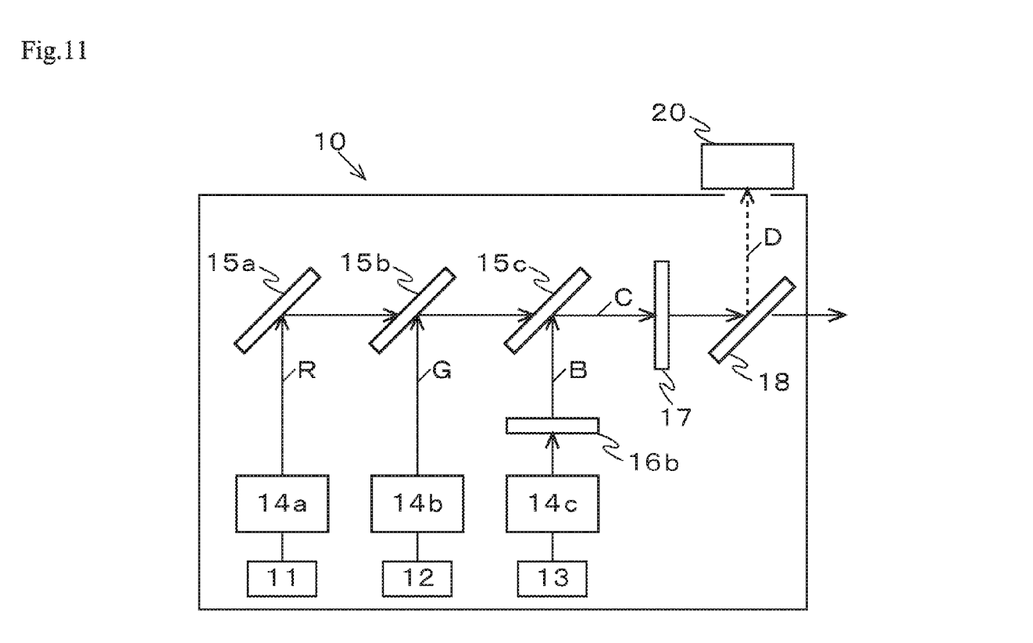
FIG. 11 is a schematic sectional view of a laser light emitting part in a second embodiment of the present invention.

A display device in a second embodiment is different from another one in that a third light attenuating part 16b which attenuates laser light B, as shown in FIG. 11, is disposed on an optical path in which only the laser light B passes, in place of an optical path of the combined laser light C of the first embodiment. Also, this display device is different from that of the first embodiment described above in that a transmitting film 18 to direct reflection light D which is a part of the combined laser light C to the optical intensity detecting part 20 is newly provided. Other constituent elements are similar to those of the first embodiment and thus same constituent elements are designated by same reference numerals in FIG. 11, and a duplicate description thereof is omitted.

The third light attenuating part 16b is an optical system which attenuates the optical intensity of the laser light B that is emitted from the LD 13. The third light attenuating part 16b is disposed on the optical path of the laser light B. Specifically, the third light attenuating part 16b is installed between a light focusing optical system 14c and a second wave combining part 15c. The laser light that has attenuated and transmitted the third light attenuating part 16b at a predetermined transmittance is emitted to the second wave combining part 15c in a state in which the optical intensity has attenuated. It is to be noted that, although in the second embodiment, the third light attenuating part 16b was disposed on the optical path so as to attenuate the optical intensity of the laser light B, the present invention is not limited thereto. For example, the third light attenuating part 16b may be disposed on an optical path of laser light R or an optical path of laser light G.

As the third light attenuating part 16b, for example, an optical system having an OD (Optical Density) value of 0.5, that is, a transmittance of 32.0% is employed, for example, an ND (Neutral Density) filter is employed. In particular an ND filter such as an apodizing filter of bull's eye type is preferred. It is to be noted that, although in the second embodiment, as the third light attenuating part 16b, the ND filter having a transmittance of 32.0% was described by way of example, for example, an ND filter having a transmittance of 20.0% to 50.0% may be employed without being limited thereto.

It is to be noted that, although in the second embodiment, there was described an example in which the third light attenuating part 16b was disposed in order to attenuate the optical intensity of the laser light B, the present invention is not limited thereto. For example, the transmittance of an emission window part of the LD 13 that emits the laser light B may be lowered, or alternatively, a reflection index of the second wave combining part 15c (the dichroic mirror) that reflects the laser light B may be decreased to the order of 70%.

Also, in the second embodiment, it is desirable that an irradiated face of the third light attenuating part 16b to which the respective laser light beams R, G, B are irradiated have an attenuation rate distribution which is proportional to the optical intensity distribution of the laser light beams (=inversely proportional transmittance distribution). In this manner, the laser light that has transmitted the third light attenuating part 16b has a uniform optical intensity distribution in the irradiation face.

In addition, it is desirable that the third light attenuating part 16b have a light stability relative to laser light. As the third light attenuating part 16b having the light stability relative to the laser light, in general, a reflection type ND filter is employed. If the reflection type ND filter is installed vertically to an angle of incidence of the laser light B, laser light B' of which optical intensity has attenuated is reflected toward the LD 13. In this case, there is a concern about degradation of the LD 13 due to emission of the laser light B', and there is an apprehension that driving over a long period of time is precluded. Accordingly, in a case where the light stability relative to the laser light is imparted to the third light attenuating part 16b, it is desirable that the third attenuating part 16b be installed so as to be displaced from being vertical to the angle of incidence of the laser light B.

It is to be noted that, as the third light attenuating part 16b, there may be a case in which a reflection type optical system to reflect a part of incident light is employed. In the case where the third light attenuating part 16b of such reflection type is employed, if a relationship between the laser light B and the third light attenuating part 16b is established as an angle of incidence of 90 degrees, the reflection light that is reflected by the third light attenuating part 16b reverts to the LD 13. Thus, the reflection light can cause heating or service life degradation of the LD 13. Therefore, a light attenuating member 18 is disposed so that the angle of incidence of the laser light B is obtained as an angle which is different from verticality, whereby reverting of the reflection light to the LD 13 is precluded, and the heating or service life deterioration of the LD 13 can be reduced.

A transmitting film 18 is made of a transmissive member having a reflection index of the order of 5%, for example. The transmitting film 18 transmits a majority of the combined laser light C from the second wave combining part 15c as it is, whereas the transmitting film reflects partial light in the direction of the optical intensity detecting part 20. In this manner, the majority of the combined laser light C that has transmitted the light dimming part 17 is emitted to the MEMS mirror 30. Hereinafter, another modification example will be described.

As another modification example, for example, although in the foregoing embodiment, the laser light R, the laser light G, and the laser light B were wave-combined and color-mixed in all on the respective optical paths by way of the wave combining unit 15, the present invention is not limited thereto. For example, the laser light R, the laser light G, and the laser light B may be wave-combined and color-mixed in all on the screen 40 that emits these laser light beams. In this case, the screen 40 functions as color mixing means.

In addition, although in the foregoing embodiment, the MEMS mirror 30 (the scanning part) was employed as a spatial light modulating element which generates an image, the present invention is not limited thereto. It may be that the display device (the HUD device 1) in the present invention displays an image by way of a spatial light modulating part such as TFT (Thin Film Transistor), LCOS (registered trademark: Liquid crystal on silicon), DMD (Digital Micromirror Device) and the LD 11 that emits red light, the LD 12 that emits green light, and the LD 13 that emits blue light.

INDUSTRIAL APPLICABILITY

The color mixing device and the display device, according to the present invention, can be applied as a headup display device to project an image onto a windshield of a motor vehicle or the like, for example.

DESCRIPTION OF REFERENCE NUMERALS

1 HUD device (display device)
2 Vehicle
3 Windshield
4 Observer
10 Laser light emitting part (color mixing device)
11 LD (red light source)
12 LD (green light source)
13 LD (blue light source)
14 Light focusing optical system
14a Light focusing optical system
14b Light focusing optical system
14c Light focusing optical system
15 Wave combining unit (color mixing means)
15a Reflection part
15b First wave combining part
15c Second wave combining part
16 Light attenuating part
17 Light dimming part (optical intensity adjusting part)
20 Optical intensity detecting part
30 MEMS mirror (scanning part)
40 Screen
50 First reflection part
60 Second reflection part
70 Casing
710 Light transmitting part
100 LD control part
200 Scanning control part
300 Light dimming control part
400 Main control part
401 CPU
402 Storage part
C Combined laser light
L Display light
M Image
V Virtual image

The invention claimed is:

1. A color mixing device, comprising:
a red light source which emits red light at optical intensity in response to a first current to be supplied;
a green light source which emits green light at optical intensity in response to a second current to be supplied;
a blue light source which emits blue light at optical intensity in response to a third current to be supplied;
a light source control part which controls the light sources; and
color mixing means for mixing the red light, the green light, and the blue light in all,
wherein a light attenuating part which attenuates the blue light emitted from the blue light source is provided,
wherein the light attenuating part makes the blue light and another color light enter therein, and the incident blue light is attenuated more significantly than said another color light and is advanced in an emission direction.

2. The color mixing device according to claim 1, further comprising an optical intensity detecting part which detects optical intensity of the blue light that does not advance in the emission direction due to transmission or reflection of the light attenuating part,
wherein the light source control part controls the blue light source in response to the optical intensity of the blue light that is detected by the optical intensity detecting part.

3. The color mixing device according to claim 2, wherein, the light attenuating part has transmittance and/or a reflection index adjusted so that the optical intensity of the blue light to be entered to the optical intensity detecting part is equal to or more than the optical intensity of the blue light that advances in the emission direction.

4. The color mixing device according to claim 1, wherein color-mixed light mixed by the color mixing means arrives at an optical intensity adjusting part to adjust light transmittance, and
the optical intensity adjusting part comprises a portion formed of an organic material at a portion at which the color-mixed light arrives.

5. The color mixing device according to claim 1, wherein the light attenuating part transmits the light so that an optical intensity distribution of the blue light that is emitted from the blue light source is uniform in an irradiated face.

6. The color mixing device according to claim 1, wherein the light attenuating member has a transmittance distribution which is inversely proportional to the optical intensity distribution of the blue light that is emitted from the blue light source.

7. A display device, comprising:
the color mixing device according to claim 1; and
a spatial light modulating part which generates an image by subjecting the color-mixed light that is mixed by the color mixing means to spatial light modulation.

8. A display device, comprising:
the color mixing device according to claim 1; and
a scanning part which scans the color-mixed light that is mixed by the color mixing means to thereby generate an image.

* * * * *